United States Patent
Schier et al.

(10) Patent No.: US 10,397,856 B2
(45) Date of Patent: Aug. 27, 2019

(54) METHOD AND SYSTEM FOR SIGNAL TRANSMISSION WITH NETWORK ASSISTANCE

(71) Applicant: ZTE Wistron Telecom AB, Kista (SE)

(72) Inventors: Thorsten Schier, Kista (SE); Patrick Svedman, Kista (SE); Aijun Cao, Kista (SE); Jan Johansson, Kista (SE); Yonghong Gao, Kista (SE); Bojidar Hadjiski, Kista (SE)

(73) Assignee: ZTE (TX) Inc., Austin, TX (US)

( * ) Notice: Subject to any disclaimer, the term of this patent is extended or adjusted under 35 U.S.C. 154(b) by 0 days.

(21) Appl. No.: 15/127,370

(22) PCT Filed: Mar. 16, 2015

(86) PCT No.: PCT/US2015/020675
§ 371 (c)(1),
(2) Date: Sep. 19, 2016

(87) PCT Pub. No.: WO2015/142704
PCT Pub. Date: Sep. 24, 2015

(65) Prior Publication Data
US 2017/0181067 A1    Jun. 22, 2017

Related U.S. Application Data

(60) Provisional application No. 61/955,945, filed on Mar. 20, 2014.

(51) Int. Cl.
*H04W 48/16*    (2009.01)
*H04W 24/02*    (2009.01)
(Continued)

(52) U.S. Cl.
CPC ............ *H04W 48/16* (2013.01); *H04W 8/005* (2013.01); *H04W 24/02* (2013.01); *H04W 24/10* (2013.01);
(Continued)

(58) Field of Classification Search
None
See application file for complete search history.

(56) References Cited

U.S. PATENT DOCUMENTS 8,712,411 B1 * 4/2014 Puliatti ................ H04W 4/00
455/434
2008/0274742 A1   11/2008   Bi
(Continued)

FOREIGN PATENT DOCUMENTS

WO     2008/085952 A1    7/2008

OTHER PUBLICATIONS

International Search Report/Written Opinion dated Jun. 16, 2015, in counterpart International Patent Application No. PCT/US2015/020675.

*Primary Examiner* — Gregory B Sefcheck
*Assistant Examiner* — Jenkey Van
(74) *Attorney, Agent, or Firm* — Perkins Coie LLP

(57) ABSTRACT

Provided is a method and wireless communication system that includes a HetNet, a serving cell with an associated coverage area and multiple additional low power nodes (LPNs) deployed in one or more clusters of cells in the coverage area. The LPNs transmit an associated discovery signal based on the timing of the associated small cell. The serving cell is configured to determine the timing of the cells and therefore the transmission pattern of the discovery signals and the serving cell configures measurement gaps such that the discovery signals are transmitted during the measurement gaps. The network is adapted to accomplish (Continued)

this for various degrees of granularity and timing measurement inaccuracies by placing the measurement gaps and/or adjusting the discovery signal (DS) transmission scheme accordingly.

22 Claims, 10 Drawing Sheets

(51) Int. Cl.
    *H04W 8/00* (2009.01)
    *H04W 24/10* (2009.01)
    *H04W 72/00* (2009.01)
    *H04W 72/04* (2009.01)
    *H04W 36/00* (2009.01)
    *H04W 48/08* (2009.01)
    *H04W 84/04* (2009.01)
(52) U.S. Cl.
    CPC ..... *H04W 36/0085* (2018.08); *H04W 72/005* (2013.01); *H04W 72/0446* (2013.01); *H04W 36/0088* (2013.01); *H04W 48/08* (2013.01); *H04W 84/045* (2013.01); *Y02D 70/00* (2018.01); *Y02D 70/1262* (2018.01)

(56) References Cited

U.S. PATENT DOCUMENTS

| | | | |
|---|---|---|---|
| 2009/0318090 A1* | 12/2009 | Flordelis | H04L 5/0007 455/67.13 |
| 2011/0305194 A1* | 12/2011 | Zheng | H04B 7/0452 370/328 |
| 2012/0190373 A1* | 7/2012 | Tenny | H04W 56/0015 455/447 |
| 2012/0263054 A1 | 10/2012 | Kazmi et al. | |
| 2015/0215799 A1* | 7/2015 | Kazmi | H04W 24/08 370/252 |
| 2016/0192332 A1* | 6/2016 | Koorapaty | H04L 5/005 370/329 |
| 2016/0234878 A1* | 8/2016 | Svedman | H04W 68/005 |
| 2016/0262100 A1* | 9/2016 | Larsson | H04W 48/16 |

* cited by examiner

METHOD AND SYSTEM FOR SIGNAL TRANSMISSION WITH NETWORK ASSISTANCE

RELATED APPLICATION

This application is a 371 National Phase Application from International Application No. PCT/US2015/020675, filed Mar. 16, 2015 and claims benefit of priority under 35 U.S.C. § 119(e) to U.S. Provisional Application 61/955,945, filed Mar. 20, 2014, entitled "Method for Signal Transmission with Network Assistance", the contents of which are hereby expressly incorporated by reference as if set forth in their entirety herein.

FIELD OF THE INVENTION

The present disclosure is related to cellular telecommunication systems, and more particularly to heterogeneous and other networks with multiple low-power nodes deployed in clusters in a macro base station's coverage area.

BACKGROUND

Today's cellular communication systems provide not only voice services, but also mobile broadband services all over the world. As the number of applications for cell phones and other wireless devices continues to increase, consuming increasing amounts of data, an enormous demand for mobile broadband data services is generated. This requires telecom operators to improve data throughput and maximize the efficient utilization of limited resources.

As the spectrum efficiency for the point-to-point link approaches its theoretical limit, one way to increase data throughput is to split big cells into smaller and smaller cells. When the cells become closer to each other, however, proximate and adjacent cell interferences become more severe, and the cell splitting gain saturates. Furthermore, it is becoming more difficult to acquire new sites to install base stations for the operators and the costs are also increasing. Therefore, cell-splitting alone cannot fulfill the demands.

Recently a new type of network deployment referred to as a HetNet (Heterogeneous Network) has been proposed and is attracting interest and considerable effort in the industry. In HetNet, another tier consisting of multiple low-power nodes is added onto the existing macro base station's coverage areas. The low-power nodes are usually deployed in clusters of cells.

The cells of the Low Power Nodes (LPNs) may operate on the same carrier frequency as the macro node, or on different carrier frequencies. In various communication protocols such as 3GPP (the 3rd Generation Partnership Project standard), it has been found that a discovery of these Low Power Nodes is not always possible with the legacy mechanism. Therefore, the introduction of a new discovery signal (DS) is discussed within various communication protocols such as 3GPP.

SUMMARY OF THE INVENTION

The disclosure provides a method and wireless communication system that includes a HetNet, a serving cell with an associated coverage area and multiple additional low power nodes (LPNs) deployed in one or more clusters of cells in the coverage area. The LPNs transmit associated discovery signals based on the timing of the associated small cell. The serving cell is configured to determine the timing of the cells and therefore the transmission pattern of the discovery signals. The serving cell configures measurement gaps such that the discovery signals are transmitted during the measurement gaps and the user equipment (UE) can detect the presence of the LPN associated with the discovery signals. The network is adapted to accomplish this for various degrees of granularity and timing measurement inaccuracies by placing the measurement gaps and/or adjusting the discovery signal (DS) transmission scheme accordingly.

BRIEF DESCRIPTION OF THE DRAWING

The present invention is best understood from the following detailed description when read in conjunction with the accompanying drawing. It is emphasized that, according to common practice, the various features of the drawing are not necessarily to scale. On the contrary, the dimensions of the various features may be arbitrarily expanded or reduced for clarity. Like numerals denote like features throughout the specification and drawing.

DETAILED DESCRIPTION

Figure 1:
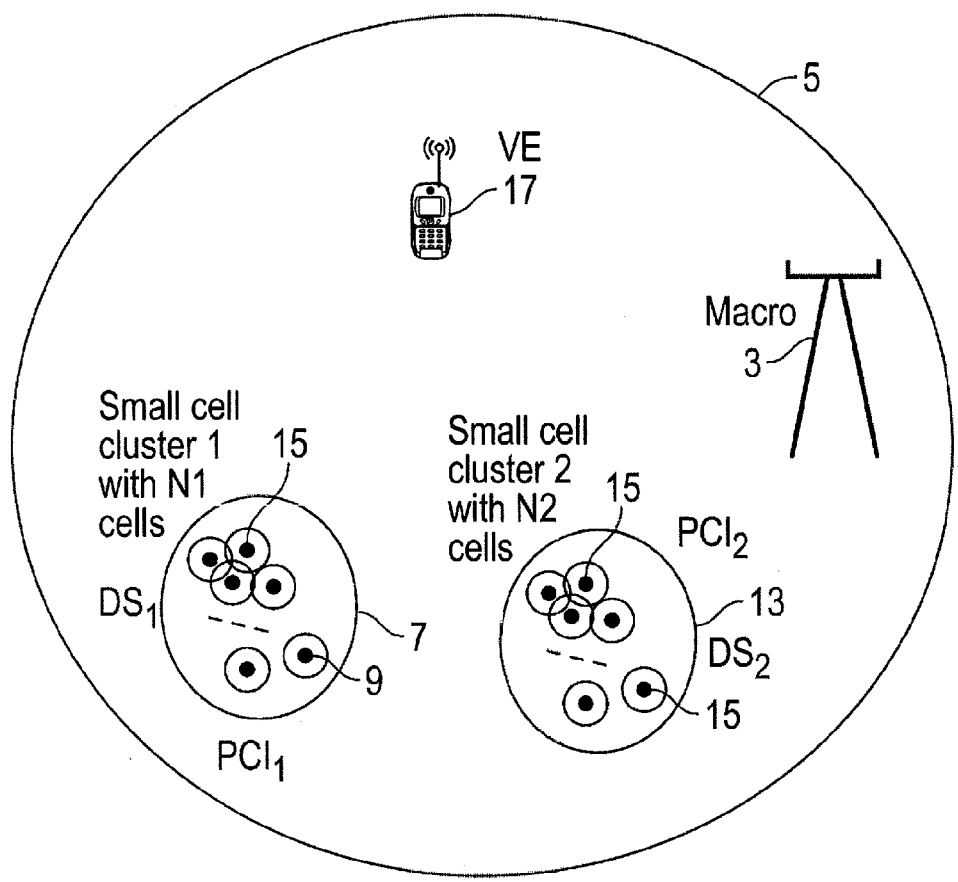
FIG. 1 is a schematic of an embodiment of a HetNet with one macro node and two clusters of low power nodes within the macro coverage area.

Devices may broadcast what are referred to as discovery signals. Discovery signals allow devices in the vicinity of one another to determine the presence of the other device and/or information that may be useful to the receiving device in determining if a connection should be established with the device transmitting the discovery signal. Discovery signals may be transmitted to communicate user identifiers, device identifiers, group identifiers, e.g., indicating membership in a particular group, service offers, product advertisements, requests for service, etc. A device may periodically transmit discovery signals to communicate the same or different information. The transmission of discovery signals allows devices entering an area to detect the presence of the transmitting device and to discover information about the device, services, etc. available from, or being sought by, the transmitting device. The discovery signal is generally identified as DS throughout the disclosure.

In a system such as a HetNet system with LPNs, it is desirable for the UE (User Equipment) to detect the presence of the low power nodes (LPNs) so that the UE can adjust its behavior accordingly and communicate with the appropriate cell/node in order for the network to operate efficiently. As above, the LPNs may transmit discovery signals.

The discovery of LPNs that operate on a different frequency from the serving cell places special demands onto the transmission scheme of the discovery signal (DS) of the LPNs. In various embodiments of the disclosure, the serving cell configures measurement gaps at the UE which uses these measurement gaps for inter-frequency measurements. In some embodiments, these measurement gaps are configured relative to the serving cell's timing. The disclosure provides for the transmission of the DS to advantageously coincide with the measurement gaps at the UE so that the UE is able to detect the DS's and the associated LPNs.

Because the DS transmission is relative to the LPN's timing, it is beneficial when the serving cell has knowledge about the LPN's timing when it configures the measurement gaps. In various 3GPP embodiments, this method is referred to as network assisted discovery. In an actual HetNet system, there may be uncertainties in the available timing information. The present disclosure analyzes and solves problems related to inaccurate timing information when performing network assisted discovery and provides methods and systems that solve such problems and provides measurement gaps during which DS transmission occurs such that the UE can receive the discovery signal during the measurement gaps.

Various embodiments described herein are discussed in the context of an LTE (Long Term Evolution) system, but the concepts, systems and methods of the disclosure are not to be construed to be restricted to LTE systems and protocols. Additionally, while the various embodiments disclosed herein are described in the context of transmission of discovery signals, it should be understood that signals for other purposes can use the schemes and methods described in this disclosure.

An embodiment of an HetNet system deployment with one macro node and two clusters of low power nodes within the macro coverage area is shown in FIG. 1. In FIG. 1, macro node 3 includes coverage area 5 and is a serving cell in many embodiments. Macro node 3 may alternatively be referred to as serving cell 3 hereinafter. Within coverage area 5 are first small cell cluster 7 and second small cell cluster 13. Within first small cell cluster 7 are first cells 9 which are low power nodes (LPNs) and within second small cell cluster 13 are second cells 15 which are also LPNs. First small cell cluster 7 includes N1 low power nodes, i.e. N1 first cells 9, and second small cell cluster 13 consists of N2 low power nodes, i.e. N2 second cells 15. N1 and N2 can represent any of various numbers of cells arranged in a cluster. User equipment (UE) 17 is also shown within coverage area 5. UE 17 represents any of various user equipment types that use wireless networks. In the description of the following embodiment, macro node 3 operates on a frequency f0 and first and second cells 9, 15 of first and second small cell clusters 7, 13 operate on frequencies f1 and f2, respectively. In some embodiments of the disclosure, frequencies f1≠f2 and in other embodiments, frequencies f1=f2. The frequency f0 of macro node 3, differs from frequencies f1 and f2.

The disclosure is described in conjunction with an embodiment in which cells within a cluster, e.g. first cells 9 within first small cell cluster 7, transmit synchronously to each other. First and second small cell clusters 7, 13 are not necessarily synchronized with the serving cell of macro node 3. Aspects of the disclosure provide that the serving cell of macro node 3 obtains knowledge and information about the timing of first cells 9 of first small cell cluster 7 and the timing of second cells 15 of second small cell cluster 13, in order to place the measurement gaps.

The measurement gaps of the serving cell are configured relative to the serving cell's timing, but the discovery signals associated with the respective LPNs (e.g., first and second cells 9, 15) are transmitted by the LPNs relative to the timing of the low power nodes, i.e. relative to the timing of first cells 9 of first small cell cluster 7 and the timing of second cells 15 of second small cell cluster 13. When the serving cell of macro node 3 knows the timing of first cells 9 and second cells 15, and the transmission pattern(s) of the DSs at the low power nodes, i.e., first cells 9 and second cells 15, the serving cell is thus configured to place the measurement gaps accordingly so that they match with the DS transmission pattern/scheme and enable to UE to detect the DSs during the measurement gaps.

In the embodiment described herein, macro node 3 and the low power nodes, i.e. first cells 9 and second cells 15, operate on different frequencies. In one embodiment of the disclosure, UE 17 that is served by macro node 3, is configured to perform inter-frequency measurements to discover the LPN's (cells 9 and 15). In various embodiments, UE 17 performs inter frequency measurements autonomously. One example of such an embodiment is an idle LTE UE which may monitor multiple frequencies and reselect based on various criteria.

Unless the UE has multiple receivers, inter frequency measurements are typically carried out during inter-frequency measurement gaps. The inter-frequency measurements may take place during inter-frequency measurement gaps that are later reconfigured by the serving cell. During these gaps the UE can tune its radio onto the new frequency and perform measurements. No uplink or downlink data from the serving cell is scheduled during such a gap.

Figure 2:
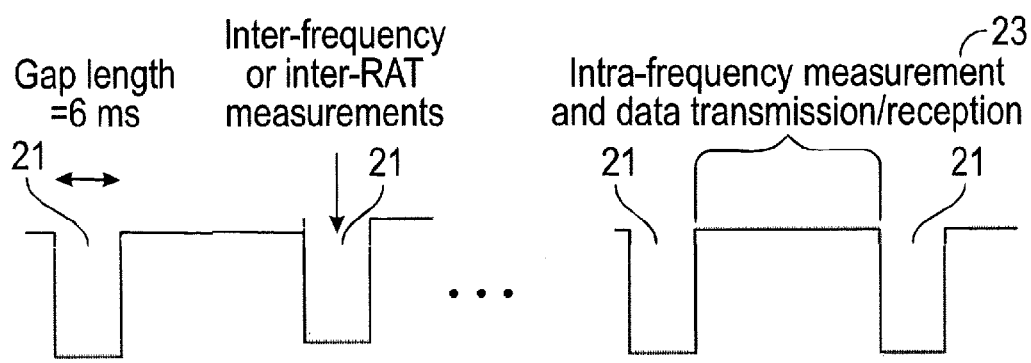
FIG. 2 shows measurement gap patterns according to an LTE embodiment of the disclosure.

In one LTE embodiment, an inter-frequency measurement gap has a length of 6 ms. In some embodiments such as illustrated FIG. 2, there may be two measurement gap repetition periods that are configurable: 40 ms and 80 ms. FIG. 2 shows a measurement gap pattern in one LTE protocol embodiment. Measurement gaps 21 are shown between intra-frequency measurement and data transmission/reception regions 23. In this embodiment, each UE may get an individual sub-frame offset assigned when the measurement gap 21 is set-up. The sub-frame offset is advantageously specified relatively to a timing of the serving cell. For a 40 ms periodicity, the sub-frame offsets can take on the values between 0 and 39 and for 80 ms periodicity, they can take on values between 0 and 79. In some embodiments, the timing of the measurement window can be set with a granularity of 1 sub-frame=1 ms.

In the context of the present disclosure, granularity means the accuracy with which the start of the measurement gap can be configured, i.e. the smallest timing unit that can be used to define the start of a measurement gap. In LTE embodiments, it is 1 ms. The start of a measurement gap that the UE can use is defined relative to the PSS/SSS timing of the serving cell but the DS is transmitted relative to the timing of the small cell cluster. The timing difference between the small cell cluster and the serving cell can be arbitrary, like an analog number. Even if the serving cell knows the exact timing difference it cannot compensate for this exactly all the time and thus, the granularity is used to represent the accuracy with which the start of the measurement gap can be configured.

In some cases, granularity describes the step-length between two neighboring numbers that can be represented. More generally, granularity is the step-size with which the serving cell can define the start of the measurement gap. In the 3GPP R12 specification, it is 1 ms, but the granularity takes on other values in other protocols and embodiments.

The disclosure describes various DS transmission schemes for different magnitudes of timing information inaccuracies. As above, when the serving cell discovers the timing of the small cell cluster and the transmission patterns of the DS at the low power nodes, this timing may carry with it an associated timing inaccuracy. In various embodiments, the network knows the largest possible deviation of the timing information from the real timing and then it chooses the DS transmission scheme accordingly. This concept is disclosed for the embodiment in which all LPN clusters within the coverage area of the serving cell have the same timing. The concept is then expanded to embodiments in which different clusters have different timings.

In the exemplary embodiments described in this disclosure, the serving cell uses the available timing information to appropriately place the measurement gap as discussed above and as shown in FIG. 2, in certain ways to facilitate an efficient signal reception, i.e. the LTE legacy measurement gap used, for instance, for inter-frequency measurements.

In other embodiments, other gaps than the currently available gaps, may be used. In one embodiment, a network assistance window is used. In another embodiment, the "measurement gap" is a new LTE measurement gap, defined for the purpose of discovery. In yet another embodiment, the "measurement gap" is any instruction, scheduling restriction or reception restriction in which it is expected that a UE performs inter-frequency measurements.

The low power nodes transmit the DS according to their own timing. The serving cell, typically a macro node such as macro node 3, configures the measurement gaps according to the serving cell's timing. In other embodiments, the serving cell configures network assistance windows according to the serving cell timing.

The serving cell is typically a macro node and the UE performs inter-frequency measurements on one or several clusters of low power nodes as above. However, the concepts described herein also apply in other embodiments such as an embodiment in which the serving cell is one LPN of a cluster and inter-frequency measurements are performed on the low power nodes of a different cluster, or an embodiment in which the serving cell is one LPN of a cluster and inter-frequency measurements are performed on the macro node according to an embodiment in which the macro node is transmitting a DS as well.

Figure 3:
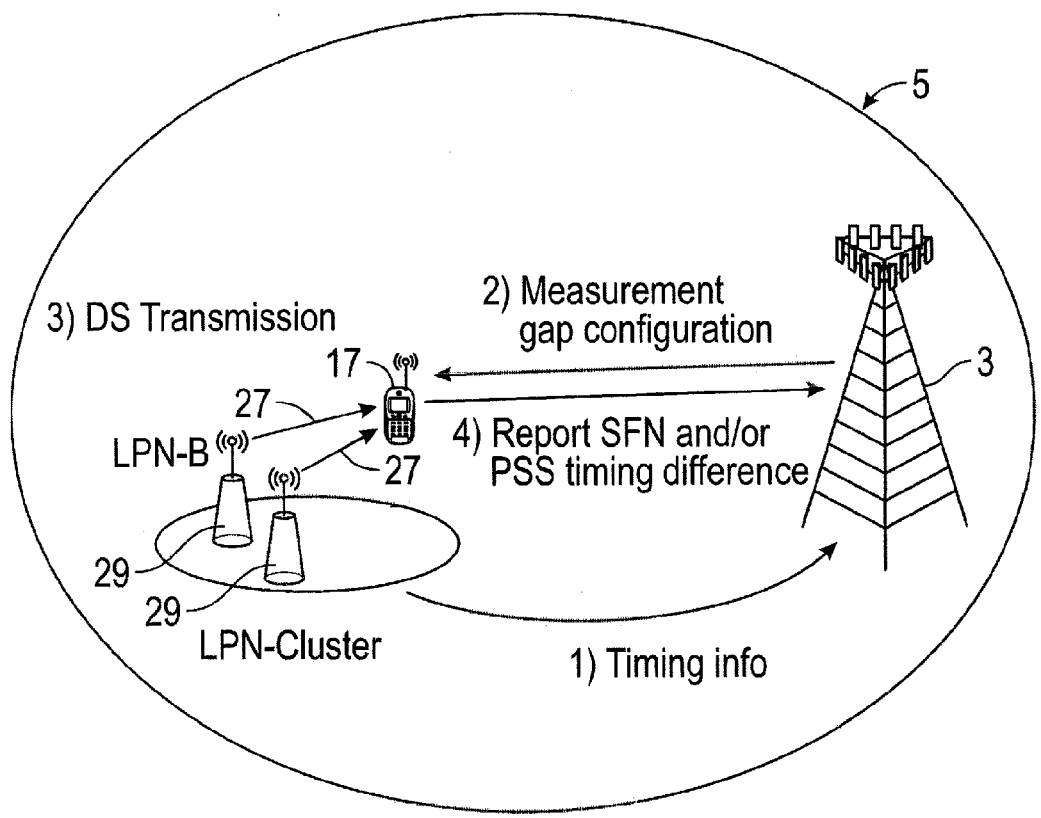
FIG. 3 is a schematic that shows a HetNet with a serving cell configuring measurement gaps according to timing information regarding the LPN cluster.

In various embodiments, an arbitrary time-offset exists between the serving cell and the LPN cluster. In this embodiment, the serving cell first determines the timing of the LPN cluster and then it can configure the measurement gaps accordingly. This is illustrated in FIG. 3 which illustrates a serving cell that configures measurement gaps according to timing information about the LPN cluster.

According to one embodiment, the cluster timing is acquired in an LTE embodiment as follows. In an initial stage, low power nodes 29 deployed in all clusters, e.g. cluster 31, are always on. DS transmission takes place along signal paths 27. Then, UE 17 performs a conventional cell search in an initial inter-frequency measurement gap. Next, if the gap captures the first 5 ms of one radio frame of the measured cell, then UE 17 can decode the MIB (Master Information Block) at the same time (the first 4 OFDM symbols of slot 1) and obtain the system frame number (SFN) of the measured cell. Next, the UE 17 reports the measured SFN and/or the relative position of the primary synchronization signal (PSS) and/or secondary synchronization signal (SSS) within the gap, to the serving cell. The serving cell is then adapted to, and does derive the relative relationship of SFNs to the small cell. Since there can be two PSS/SSS within a gap, another embodiment includes UE 17 simply reporting the frame offset, or UE 17 reporting the relative time difference with some granularity, e.g. 1 ms (which is similar to reporting SFN and frame offset with 1 ms granularity).

If the gap captures the second 5 ms of one radio frame of the measured cell, then UE 17 reports a message to the macro cell 3 to indicate that the current gap pattern does not cover physical broadcast channel (PBCH) of the measured cell 29, and the message includes the relative position of PSS/SSS within the gap in order to facilitate the macro cell 3 to re-assign the appropriate gap pattern. Then macro cell 3 moves the starting point of the measurement gap according to the reported relative position of PSS/SSS within the gap so as to make the gap fully cover the PBCH, i.e., the macro cell 3 repositions the measurement gap. With the new configured gap pattern including the PBCH within the gap, UE 17 can perform the conventional cell search and perform step.

Once all of the relative timing relationship of all small cell clusters 27 are obtained, macro cell 3 notifies small cells 29 to start ordinarily on-off operations and that small cells 29 may turn off legacy PSS/SSS and PBCH transmission. The operations of the first stage can be periodically executed in case of tracking timing drifting. In some embodiments, there is one indicator that indicates to the UE, whether it should perform the first stage operations above.

Figure 4:
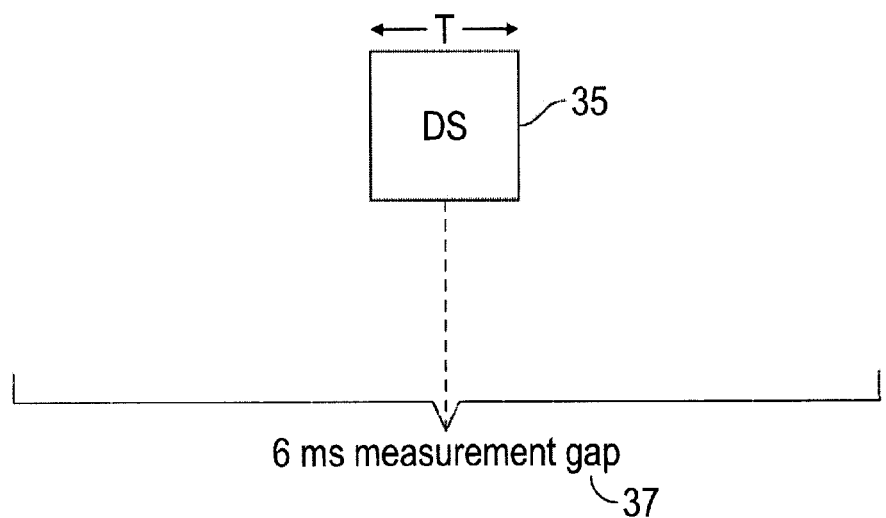
FIG. 4 shows a discovery signal centered within a measurement gap according to an embodiment of the disclosure.

The serving cell (e.g., macro cell 3) has acquired the timing information 33 of cluster 31 of low power nodes 29 as described above. In various embodiments, the serving cell is adapted to reposition/reconfigure the initial inter-frequency measurement gap and to configure the new measurement gap in such way that the DS transmission occurs directly centered in the middle of the measurement gap such as shown in FIG. 4. In this manner, early and late time deviations from the ideal transmission point are covered equally. The DS-centric measurement gap positioning is illustrated in FIG. 4 in which "T" is the duration time of DS 35 and measurement gap 37 is a 6 ms measurement gap. Measurement gaps of other durations are used in other embodiments.

In some embodiments covered by the disclosure, there may be limitations affecting how accurately the serving cell can place the measurement gaps. These limitations may come from the granularity with which the measurement gap can be configured or from inaccuracies in the cluster timing information that is available at the serving cell. Depending on the magnitude of this inaccuracy, a measurement gap might be misplaced so that the DS would not otherwise be received by the UE if not for the principles of the disclosure.

According to the following embodiment, all clusters have the same timing but are not synchronized to the serving cell. The serving cell has no influence on the timing of the small cells of the cluster of LPN's/cells. The serving cell detects and knows the timing of the small cells, but the serving cell cannot adjust that timing. In an embodiment according to the 3GPP standard, the sub-frame offset of the measurement gap is configured by the serving cell with a granularity of 1 ms (=1 sub-frame). In this embodiment, it cannot be guaranteed that the measurement gap can be placed such that the DS is exactly in the middle of the measurement gap as in FIG. 4.

Figure 5:
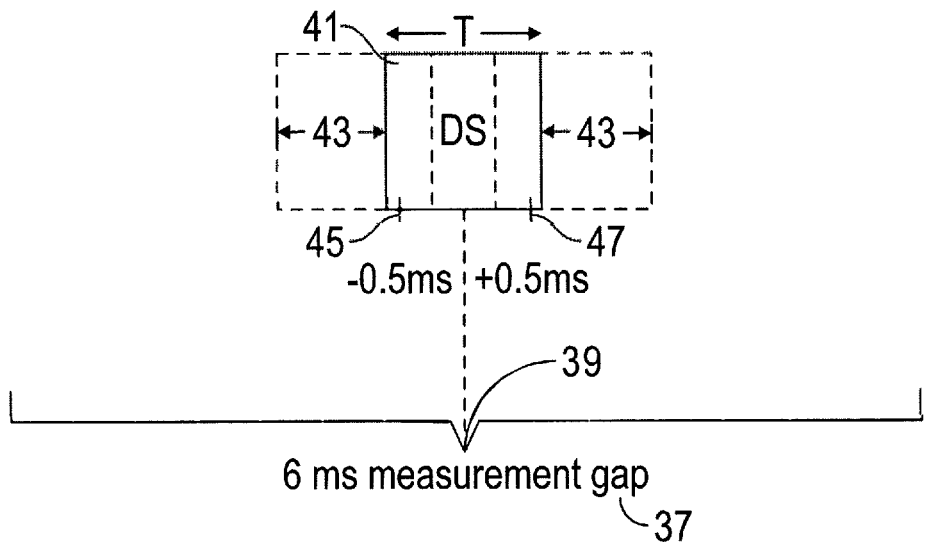
FIG. 5 shows a discovery signal within a measurement gap according to an embodiment of the disclosure.

FIG. 5 presents an embodiment with a granularity of 1 ms and shows an offset of DS 41 from the measurement gap center of about 0.5 ms. This deviation or rounding error due to granularity, is referred to and denoted by $\Delta_1$. FIG. 5 shows a 6 ms measurement gap 37 with center point 39. Due to the granularity deviation, DS 41 having a duration indicated by "T", may be located by distance 43 off-center. Alternatively stated, DS 41 may be centered at location 45 or location 47, still within measurement gap 37.

Another potential error source which may impact the placement of the DS window in the measurement gap, is accuracy of the information that the serving cell has available about the small cell layer timing. This non-ideal timing information is hereinafter denoted $\Delta_2$, which is the error in the timing information and may be referred to as timing information inaccuracy. Many factors may have an impact on this value. Such factors include but are not limited to outdated timing information; propagation delay between serving cell and UE as well as propagation delay between UE and small cell layer; and, the method of how the serving cell acquires the small cell layer timing. The value of $\Delta_2$ is implementation-related and differs for different embodiments and deployments, network realization concepts and even different cells.

In either of the aforementioned embodiments, the present disclosure provides for generating the measurement gap such that the DS is located within the measurement gap. Further, depending on the expected deviation of the DS from the measurement gap center, the present disclosure provides different DS transmission schemes and measurement window placement strategies to assure that the DS is transmitted and readable by the UE's during the measurement gaps.

The following examples are intended to be illustrative and not limiting of the various aspects of the present disclosure.

EXAMPLES

Example #1

$$0.5 \text{ ms} + \Delta_2 + T/2 \leq 3 \text{ ms}$$

Figure 6:
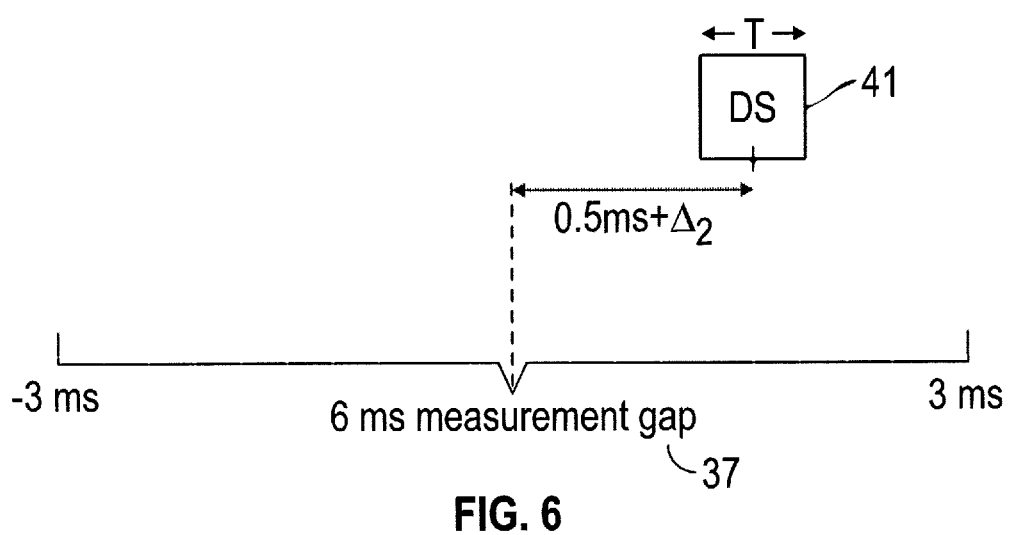
FIG. 6 shows a discovery signal not centered, but within a measurement gap according to embodiments of the disclosure.

FIG. 6 shows an embodiment in which 0.5 ms represents the deviation and rounding error caused by the granularity $\Delta_1$ of the window configuration according to an embodiment of the Release 8-11 LTE standard. For other embodiments in which a different granularity is used, $\Delta_1$ takes on values other than 0.5 ms. FIG. 6 shows an embodiment in which timing information accuracy $\Delta_2$ is smaller than [3 ms−0.5 ms−(T/2)], and the entire DS is received completely within the measurement gap.

In the general case, $\Delta_1$ appears in the preceding equation instead of 0.5 ms. The preceding equation (0.5 ms+$\Delta_2$+T/2≤3 ms) can be more generally expressed as $\Delta_1+\Delta_2+T/2 \leq T_{gap}/2$, where $T_{gap}$ represents the length of the measurement gap. In other words, if the total of the granularity, $\Delta_1$ and the measurement inaccuracy, $\Delta_2$ plus half of the duration of the DS is less than half of the length of the measurement gap, then it is guaranteed that the DS is received during the measurement gap, i.e. the DS will be completely transmitted during the measurement gap.

In the following exemplary embodiments, the value of 0.5 ms for $\Delta_1$ is used but other values for $\Delta_1$ are used in other embodiments.

The value of 3 ms used in this exemplary embodiment is equal to the half measurement gap length expressed as $T_{gap}/2$, where $T_{gap}$ represents the length of the measurement gap which is 6 ms in one LTE embodiment. It is understood that this embodiment for the LTE case is presented in FIG. 6 as an example only and other measurement gap lengths are used in other embodiments. In this embodiment, the uncertainty in the window placement (i.e. timing information inaccuracy $\Delta_2$) is sufficiently small such that it can be guaranteed that measurement gap 37 can be configured in such way that the entire DS is received. This is illustrated in FIG. 6 which shows DS 41 and measurement gap 37 as described above. In FIG. 6, timing information accuracy $\Delta_2$ is smaller than [3 ms−0.5 ms−(T/2)] and the entire DS 41 is received and positioned within measurement gap 37.

Example #2

$$0.5 \text{ ms} + \Delta_2 - T/2 < 3 \text{ ms}$$

Figure 7:
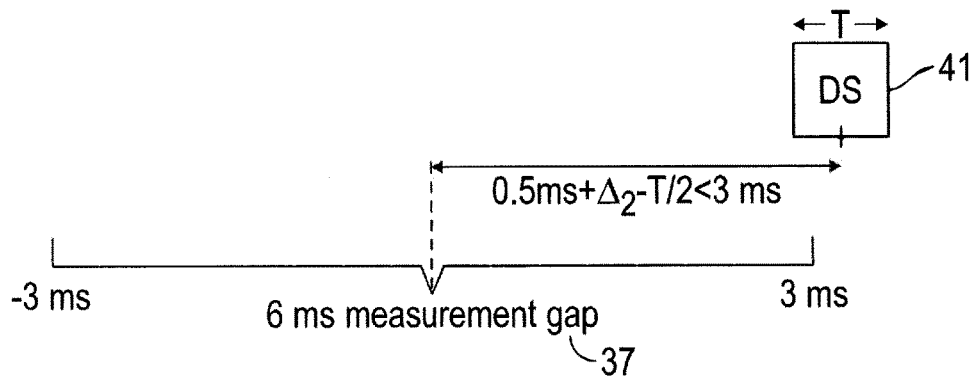
FIG. 7 shows an embodiment in which the discovery signal is partially outside of the measurement gap.

In this embodiment, shown in FIG. 7, granularity $\Delta_1$=0.5 ms, $T_{gap}/2$ is 3 ms, and a part of the DS 41 is received in measurement gap 37, but the entire DS 41 is not received in measurement gap 37. FIG. 7 shows an embodiment in which the timing information accuracy is better than [3 ms−0.5 ms+(T/2)]. In the embodiment illustrated in FIG. 7, the timing information accuracy is better than [3 ms−0.5 ms+(T/2)] because according to the equation 0.5 ms+$\Delta_2$−T/2<3 ms, so DS 41 is partially but not completely within the 6 ms measurement gap 37.

Figure 8A:
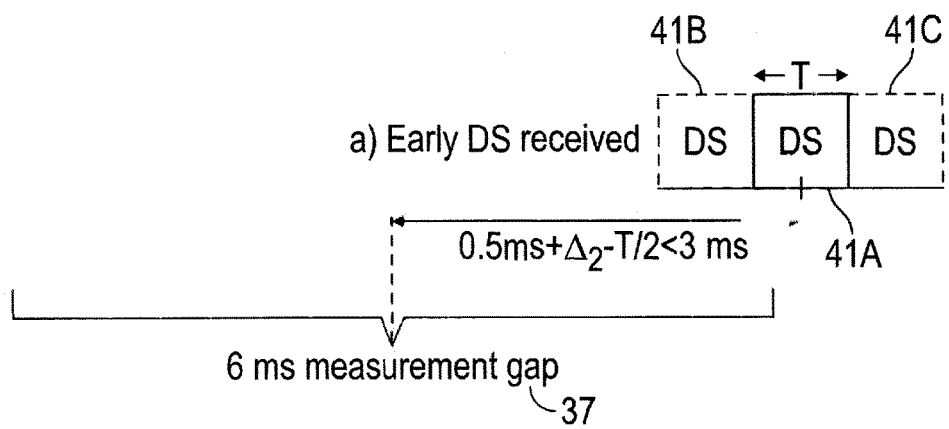
FIGS. 8A and 8B illustrate two examples of a triple transmission of discovery signals relative to a measurement gap according to embodiments of the disclosure.
Figure 8B:
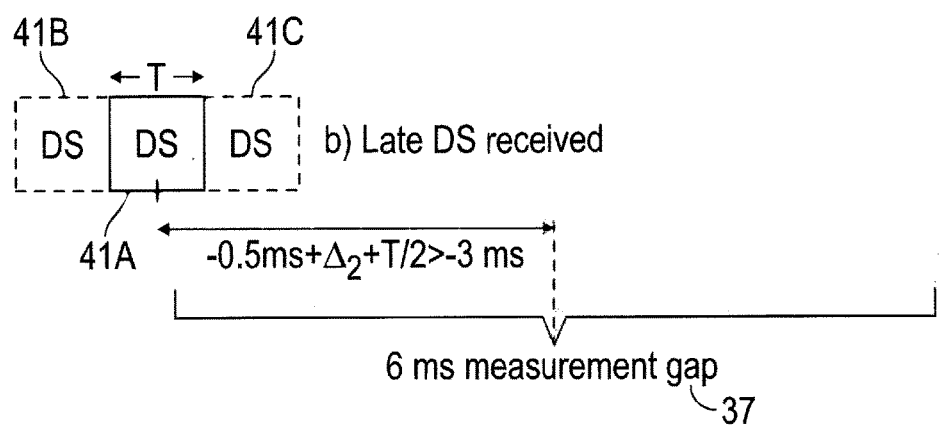

In an embodiment of this example in which the original DS is not completely within measurement gap 37, the disclosure provides for three adjacent copies of the DS to be transmitted by the LPNs as shown in FIGS. 8A and 8B. FIGS. 8A and 8B show a triple transmission of DS in case $\Delta_2$<2.5 ms+T/2. The three adjacent copies of the DS include one copy DS 41A in the original position, i.e. DS 41A is the DS targeting the center of the measurement gap. Additionally, one copy DS 41B precedes DS 41A and one copy of DS 41C, is directly after the original discovery signal, DS 41A. Due to the larger timing uncertainty in this example compared to the previous example, it cannot be certain that DS that targets the center of the measurement gap is received completely within the measurement gap. It can only be guaranteed that the DS will start within the measurement gap, but not that it will end within the gap. Thus, there is no guarantee that the DS is received completely within the gap. As such, to address the larger timing uncertainty of this example, the disclosure provides for transmitting one copy of the DS before the original DS (DS 41A) that targets the center, and another copy of the DS after the DS that targets the center. In this manner, it is ensured that at least one copy of the DS will be within the measurement gap and discovered by the UE. Note that DS 41A, DS 41B and DS 41C are three copies of the same discovery signal. They are transmitted at different time-instants in order to make sure that the UE can detect the discovery signal even when there is a large timing uncertainty to place the measurement gap. In this embodiment, the transmission of three adjacent copies of the DS by the network assures that one DS is always received completely in measurement gap 37. According to aspects of the disclosure, different DS transmission schemes are provided, and different measurement gap placement strategies are used by the serving cell. If measurement gap 37 is configured earlier than the DS 41 is expected, i.e. DS 41A, then an early copy of the DS is received, i.e. DS 41B, as in FIG. 8A. Alternatively, if measurement gap 37 is configured later than the DS 41A is expected, then the late copy of the discovery signal, DS 41C is received as in FIG. 8B.

Further Examples

Adjacent Transmissions of DS

The concept of FIGS. 8A and 8B may be extended for larger uncertainties in the timing information errors according to various other embodiments. This is shown in the equations below for various numbers of DS transmissions made to assure that at least one DS is received within the measurement gap.

$$\Delta_2 \le 2.5 \text{ ms} + T/2 \Rightarrow 3 \text{ transmissions of } DS \quad \text{Equation Set \#1}$$
$$\Delta_2 \le 2.5 \text{ ms} + 3T/2 \Rightarrow 5 \text{ transmissions of } DS$$
$$\Delta_2 \le 2.5 \text{ ms} + 5T/2 \Rightarrow 7 \text{ transmissions of } DS$$
$$\vdots$$
$$\Delta_2 \le 2.5 \text{ ms} +$$
$$(2i+1)T/2 \Rightarrow (2i+3) \text{ transmissions of } DS; i \in N_0$$

Figure 9:
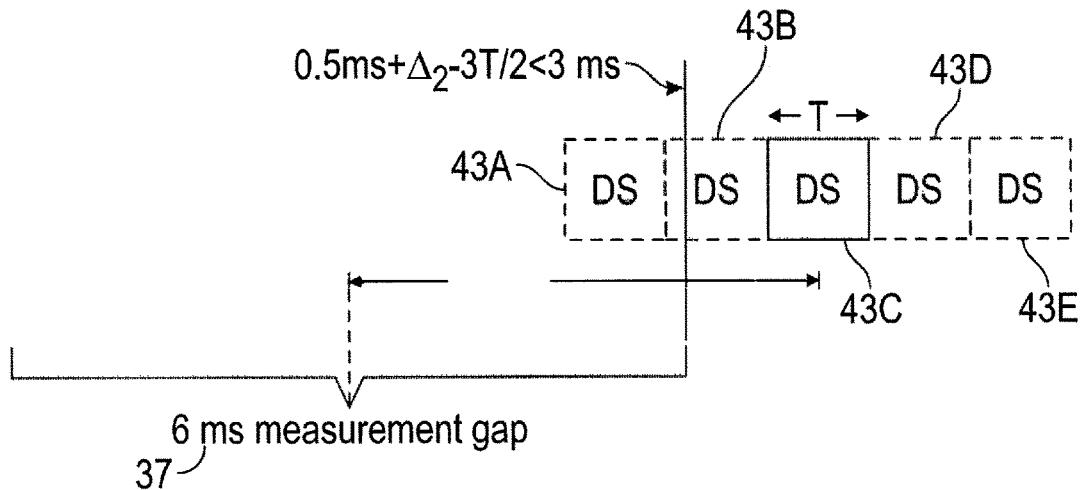
FIG. 9 shows five adjacent discovery signal transmissions relative to a measurement gap according to an embodiment of the disclosure.

In the equations of Equation Set #1, an equal number of DS transmission is carried out before and after the original DS. The embodiment $\Delta_2 \le 2.5$ ms+3 T/2 is illustrated in FIG. 9 which includes 5 transmissions of DS according to Equation Set #1 and shows that the DS transmissions are adjacent. FIG. 9 and Equation Set #1 indicate that if 5 adjacent DS transmissions occur where the timing inaccuracy satisfies the condition $\Delta_2 \le 2.5$ ms+3 T/2 a DS transmission will occur during the measurement gap. Equation Set #1 also indicates that if 7 adjacent DS transmissions occur where the timing inaccuracy satisfies the condition $\Delta_2 \le 2.5$ ms+5 T/2 a DS transmission will occur during the measurement gap, and so on.

FIG. 9 shows 5 adjacent DS transmission (2 early copies and 2 late copies) in the case of $\Delta_2 \le 2.5$ ms+3 T/2. In FIG. 9, measurement gap 37 is a 6 ms measurement gap. Two early copies of a discovery signal transmission are shown as DS 43A and 43B. Discovery signals DS 43D and 43E are late copies of the expected discovery signal, DS 43C. Measurement gap 37 is configured depending on granularity, $\Delta_1$, the timing information inaccuracy $\Delta_2$ and the number of DS transmissions such that discovery signal DS 43A is completely received within measurement gap 37. Equation Set #1 demonstrates that, as the timing inaccuracy $\Delta_2$ increases, the number of DS transmissions needed to assure that one of the discovery signals is received within the measurement gap, increases.

Other Examples

Non-adjacent Transmissions of DS

Equation Set #1 demonstrates that very large timing inaccuracies require transmission of many copies of the DS if all copies are transmitted adjacent to each other in order to insure that there is a DS within the measurement gap. Therefore, in some embodiments, copies of the DS are transmitted with a guard time in between them to increase efficiencies In some embodiments, the guard time used between the DS's, depends on the duration time of the DS, ("T") and the duration of the measurement gap (or the duration of a network assistance window), $T_{gap}$. In some embodiments, $t_{guard} = T_{gap} - T$.

Figure 10:
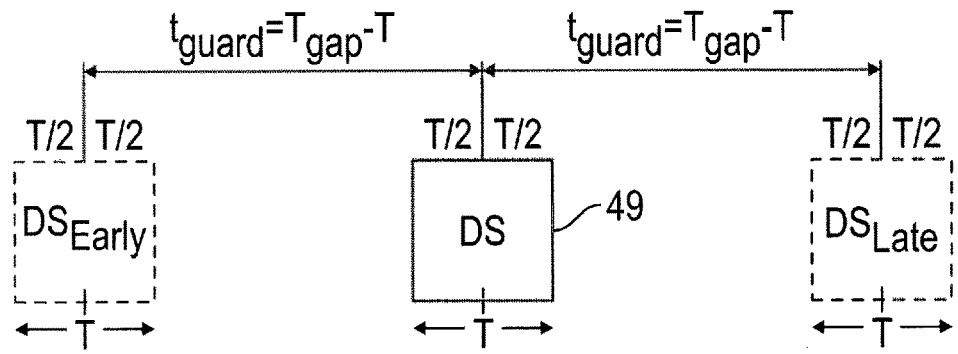
FIG. 10 shows an embodiment of non-adjacent discovery signal transmissions relative to a measurement gap according to an embodiment of the disclosure.

FIG. 10 provides an embodiment of non-adjacent transmission of DSs. In this disclosure, "adjacent transmissions" signifies transmissions with zero guard time, $t_{guard}$ between successive discovery signals. In the embodiment illustrated in FIG. 10, two non-adjacent copies of the DS are transmitted together with the original DS 49. In one LTE embodiment, $T_{gap}$ is equal to 6 ms. One copy, $DS_{Early}$, is sent $t_{guard}$ ms before original DS 49 and another copy, $DS_{Late}$, is sent $t_{guard}$ ms after original DS 49.

Figure 11:
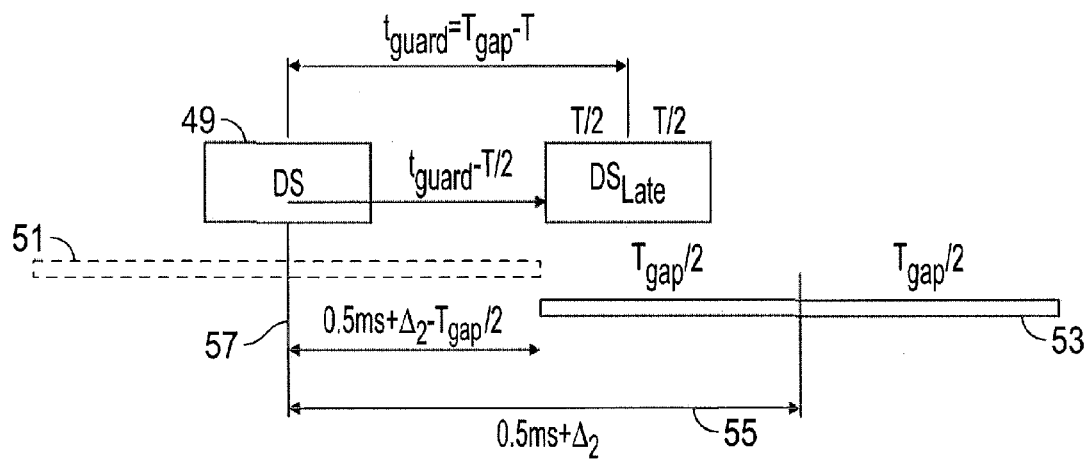
FIG. 11 shows non-adjacent discovery signal transmissions and indicates a maximum tolerable timing error according to an embodiment of the disclosure.

The measurement gap configured by the serving cell, is targeted to be centered around the middle (original) DS 49. This is illustrated in further detail in FIG. 11, in which only the center DS 49 and the late DS, i.e. $DS_{Late}$, are shown. In FIG. 11, dashed box 51 is the target position of the measurement gap and represents that this measurement window is targeted to be placed around the center of the original DS 49. Due to timing uncertainties, the target position measurement gap indicated by dashed box 51, is misplaced, however, and appears as solid box 53 such that the DS transmission $DS_{Late}$ is received within the measurement gap indicated as solid box 53. FIG. 11 shows non-adjacent DS transmissions and is an embodiment that illustrates a maximum tolerable timing error in which a discovery signal $DS_{Late}$ is completely within the measurement gap that appears as solid box 53. The deviation 55 from the target position 57 is calculated to be 0.5 ms+$\Delta_2$ in the case of an LTE embodiment with a granularity, $\Delta_1$, of 0.5 ms. More generally, deviation 55 is $\Delta_1 + \Delta_2$, where $\Delta_1$ is the error caused due to the granularity of the measurement window configuration and $\Delta_2$ is the uncertainty of the available timing information.

FIG. 11 illustrates that: 0.5 ms+$\Delta_{2max} - T_{gap}/2 = -T/2$ where $\Delta_{2max}$ is the maximum tolerable error in the timing uncertainty. For a value of $\Delta_2$ larger than $\Delta_{2max}$, no DS would not be received in the associated measurement gap, i.e. solid box 53. Incorporating the previous equation of $t_{guard} = T_{gap} - T$, the preceding equation can be expressed as equation Set #2.

$$0.5 \text{ ms} + \Delta_{2max} - T_{gap}/2 = \quad \text{Equation Set \# 2}$$

-continued $$T_{gap} - 3T/2 \Rightarrow 0.5 \text{ ms} + \Delta_{2max} =$$
$$3/2 \cdot (T_{gap} - T) \Rightarrow \Delta_2 \leq \Delta_{2max} =$$
$$3/2 \cdot (T_{gap} - T) - 0.5 \text{ ms}$$

As long as the maximum timing error (excluding the granularity error) is less than $1.5*(T_{gap}-T)-0.5$ ms, one copy of the DS can be received completely within the measurement gap. In other embodiments, the value for $t_{guard}$ can also be chosen according to the worst expected error in the timing information. As long as the worst case error is less than that calculated in Equation Set #2, a tighter transmission of the DS copies is possible.

Additional Examples

The following examples involve timing inaccuracies larger than in previously described examples, i.e., larger than $1.5*(T_{gap}-T)-0.5$ ms. If the timing inaccuracy is larger than that calculated in Equation Set #2, then more copies of non-adjacent DS's are transmitted according to various embodiment of the disclosure. Equation Set #2 can be generalized as Equation Set #3, below:

$$0.5 \text{ ms} + \Delta_{2max} - T_{gap}/2 = \quad \text{Equation Set \#3}$$
$$k \cdot t_{guard} - T/2 \Rightarrow \Delta_{2max} =$$
$$k \cdot t_{guard} - T/2 + T_{gap}/2 - 0.5 \text{ ms} \Rightarrow \Delta_{2max} =$$
$$k \cdot (T_{gap} - T) - T/2 + T_{gap}/2 -$$
$$0.5 \text{ ms} \Rightarrow \Delta_2 \leq \Delta_{2max} =$$
$$k \cdot (T_{gap} - T) - T/2 + T_{gap}/2 - 0.5 \text{ ms},$$

where $k \in N_0$. When the maximum timing error is bound by the expression in Equation Set #3, then k copies of the DS are transmitted before and k copies of the DS are transmitted after the original DS. The distance between two neighboring, non-adjacent DS's is consistently $t_{guard}$ throughout the DS transmission scheme. The total number of DS transmitted is always uneven in this example.

Further Examples

Figure 12:
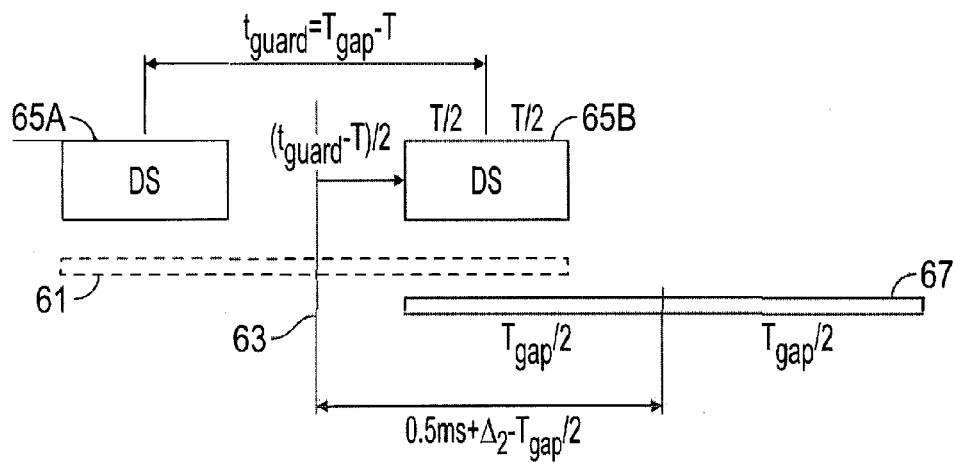
FIG. 12 shows non-adjacent DS transmissions relative to a measurement gap according to various embodiments of the disclosure.

In some examples, the measurement gap is targeted to be centered between two successive, non-adjacent DSs, as illustrated in FIG. 12. In the previous embodiments, the measurement gap was targeted to be centered around the original DS. In other embodiments such as shown in FIG. 12, the measurement gap is targeted to be centered between two copies of a DS. In this embodiment, an even number of the DS's is transmitted. The time between two copies of a DS is defined by $t_{guard}=T_{gap}-T$. The measurement gap indicated by dashed box 61, is targeted to be centered about the middle 63 of the spacing $t_{guard}$ between two successive DS transmissions 65A and 65B, as shown in FIG. 12 which illustrates the case of two transmitted DS's. Due to timing uncertainties, the real position of the measurement gap can be shifted from the targeted position indicated by dashed box 61, and is indicated by solid box 67. The serving cell which configures the measurement gap at the UE has no exact knowledge about DS transmission time instants, i.e. the time when the LPNs transmit the DS. But with the given uncertainties of this example, when the serving cell targets the center of the gap in the middle between two DS transmissions as indicated by dashed box 61, it can be ensured that the real measurement gap as indicated by solid box 67, still covers at least one copy of the DS according to the disclosure.

Equation Set #4 provides a calculation for the maximum timing error that can be handled with this approach:

$$(t_{guard} - T)/2 = \quad \text{Equation Set \#4}$$
$$0.5 \text{ ms} + \Delta_{2max} - T_{gap}/2(T_{gap} - T - T)/2 =$$
$$0.5 \text{ ms} + \Delta_{2max} - T_{gap}/2 \Rightarrow 0.5 \text{ ms} + \Delta_{2max} =$$
$$T_{gap}/2 - T + T_{gap}/2 \Rightarrow 0.5 \text{ ms} + \Delta_{2max} =$$
$$T_{gap} - T \Rightarrow \Delta_2 \leq \Delta_{2max} = T_{gap} - T - 0.5 \text{ ms}$$

According to the embodiment of Equation Set #4, with two DS transmissions, the maximum tolerable time inaccuracy in which the DS transmission takes place during the measurement gap, is "$T_{gap}-T-0.5$ ms". In other embodiments, larger even numbers of DS can be transmitted, e.g. 4, 6, 8 and so on.

In embodiments in which the measurement gap is targeted to be centered in the middle between the DS copies, larger timing errors than what are described in Equation Set #4 can be handled. A general formula for the largest tolerable timing error depending on the number of DS copies that are transmitted is given in Equation Set #5.

$$k \cdot t_{guard} + (t_{guard} - T)/2 = \quad \text{Equation Set \#5}$$
$$0.5 \text{ ms} + \Delta_{2max} - T_{gap}/2 \Rightarrow k(T_{gap} - T) +$$
$$(T_{gap} - 2T)/2 = 0.5 \text{ ms} + \Delta_{2max} -$$
$$T_{gap}/2 \Rightarrow kT_{gap} - kT + T_{gap}/2 - T + T_{gap}/2 =$$
$$0.5 \text{ ms} + \Delta_{2max} \Rightarrow kT_{gap} + T_{gap} - kT - T =$$
$$0.5 \text{ ms} + \Delta_{2max} \Rightarrow 0.5 \text{ ms} + \Delta_{2max} =$$
$$(k+1)T_{gap} - (k+1)T \Rightarrow \Delta_2 \leq \Delta_{2max} =$$
$$(k+1)T_{gap} - (k+1)T - 0.5 \text{ ms},$$

where $k \in N_0$. The maximum tolerable timing error is bound by "k." In total, "2 k+2" equidistant transmissions of the DS are carried out.

Additional embodiments involve piecewise reception of DS. In the previous embodiments, the entire DS was to be received within the same measurement gap and in a certain order. In some embodiments, one DS is received in its whole, i.e. a DS is not further split into smaller parts which are received out of order or with additional time between the smaller DS's. In other embodiments, a DS may be split into smaller parts that may be received out of order and/or with additional time between them. In another embodiment the DS is split into parts, with all the parts to be received during one measurement gap, but not necessarily in the right order. The concept of the "right order" is explained as follows: In an embodiment in which the DS is split into several parts, e.g. DS0+DS1, the different parts are transmitted at different time-instants. The "right order" is DS0 being transmitted before DS1. The "right order" of reception would be if the UE receives DS0 before DS1. For some measurement gap configurations, it could be the case that first the DS1 is received and then DS0 is received from a later copy of the DS and in this example the discovery signals are not received in the right order.

Figure 13:
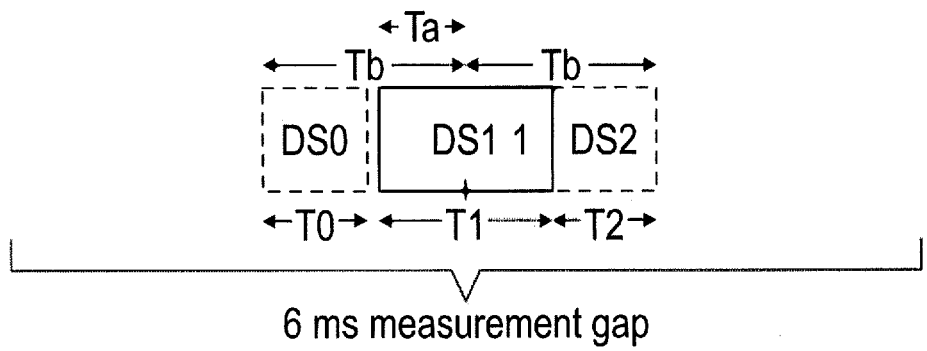
FIG. 13 illustrates a piecewise definition of a discovery signal relative to a measurement gap according to an embodiment of the disclosure.

FIG. 13 illustrates a piecewise embodiment in which the different parts of the DS are separated in time and/or possibly overlapping and/or possibly not directly adjacent one another. In this embodiment, the different parts of the DS are received within the 6 ms measurement gap, but not necessarily in order. FIG. 13 shows different parts of a DS, namely DS0, DS1 and DS2 in which DS1 and DS2 are adjacent but DS0 and DS1 are not adjacent as defined above. DS0, DS1 and DS2 have corresponding durations T0, T1 and T2. The manipulation of the discovery signals and configuration of the measurement gap for this embodiment is shown in FIG. 14.

In some embodiments, copies of parts of the DS are created and placed repeatedly. This ensures that the within certain error bounds the whole signal can be received within one measurement gap. The parts of the DS are not required to be received in order according to this embodiment.

Figure 14:
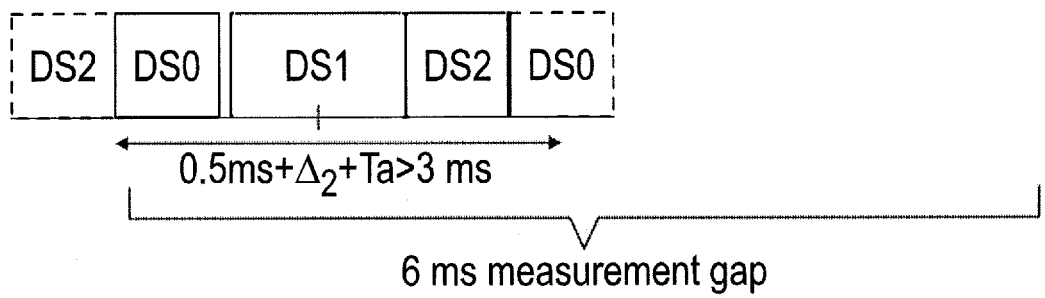
FIG. 14 illustrates another piecewise definition of a discovery signal relative to a measurement gap according to an embodiment of the disclosure.

An embodiment in which $Ta+\Delta_2+0.5$ ms is larger than 3 ms, is illustrated in FIG. 14, in which Ta is defined as in FIG. 13. In FIG. 14, first DS1 is received, then DS2 is received and then, finally DS0 is received. This is a reception where the discovery signals are not received in the right order.

Figure 15:
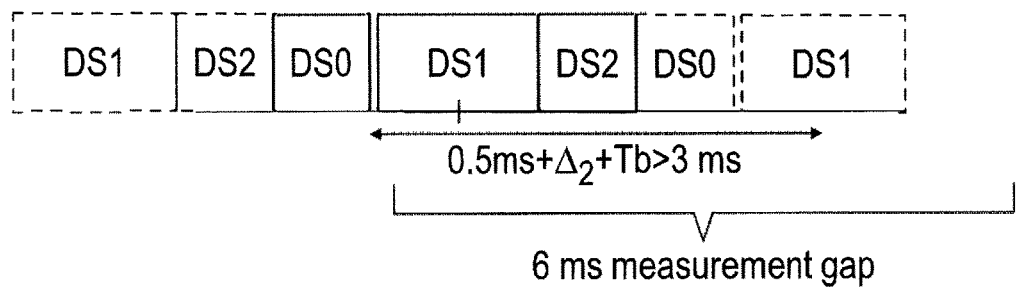
FIG. 15 illustrates a piecewise definition of a discovery signal relative to a measurement gap according to another embodiment of the disclosure.

Another embodiment for the case that $Tb+\Delta_2+0.5$ ms is larger than 3 ms, is illustrated in FIG. 15 in which Ta is defined as in FIG. 13. FIG. 15 illustrates an embodiment of piecewise reception of DS, $Tb>3$ ms$-\Delta_2-0.5$ ms.

The examples illustrated in FIGS. 14 and 15 are examples of the same concept. A DS is split-up into several parts denoted DS0, DS1 and DS2. In order to receive the complete DS, all parts of the DS need to be received. Thus, the UE needs to receive DS0, DS1 and DS2. However, it is not required in this embodiment that DS0 is received before DS1, i.e. the timing order in which DS0, DS1 and DS2 are received by the UE, need not be the same as the order in which they were transmitted from the cell (i.e. the LPN).

In FIG. 14, the timing uncertainty is smaller than that in FIG. 15. In FIG. 14, the complete DS is represented by DS0, DS1, and DS2. Since the measurement gap cannot be ensured to cover DS0, DS1, and DS2, the last part (DS2) is transmitted before the DS and the first part (DS0) is transmitted after the DS. Thus the DS parts transmitted by the LPN are: DS2, DS0, DS1, DS2, DS0. FIG. 14 shows that DS1, DS2 and DS0 indicated by the dashed box, are received with the measurement gap.

Figure 16:
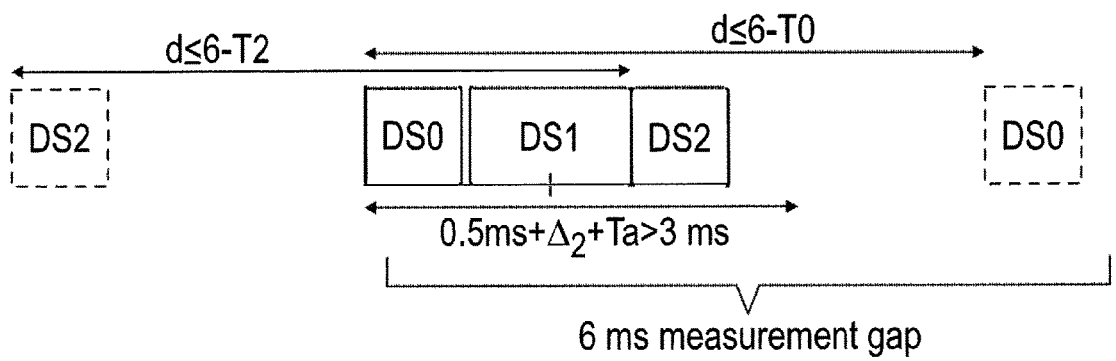
FIG. 16 shows an embodiment of non-adjacent transmission of parts of a discovery signal relative to a measurement gap according to embodiments of the disclosure.

In FIG. 15, the timing uncertainty is larger than in the embodiment illustrated in FIG. 14, and it cannot be guaranteed the that the DS is received completely within the gap by only transmitting the DS2 before the DS and the DS0 after the DS. In this embodiment, two parts need to be transmitted before and after: DS1, DS2, DS0; DS1, DS2, DS0; DS1, as shown in FIG. 15 to insure that the entire DS is received. FIG. 15 shows that DS2, DS 0 indicated by the dashed box, and DS1 indicated by the dashed box, are received with the measurement gap In still further embodiments, the parts of the DS need not be transmitted adjacent one another in order to be transmitted during the measurement gap provided by the serving cell. This is illustrated in FIG. 16 for the case $Ta+\Delta_2+0.5$ ms$>3$ ms. FIG. 16 shows non adjacent transmission of parts of the DS for 0.5 ms$+Ta+\Delta_2>3$ ms. A similar embodiment involves the case $Tb+\Delta_2+0.5$ ms$>3$ ms. Ta and Tb are as indicated in FIG. 13.

Figure 17:
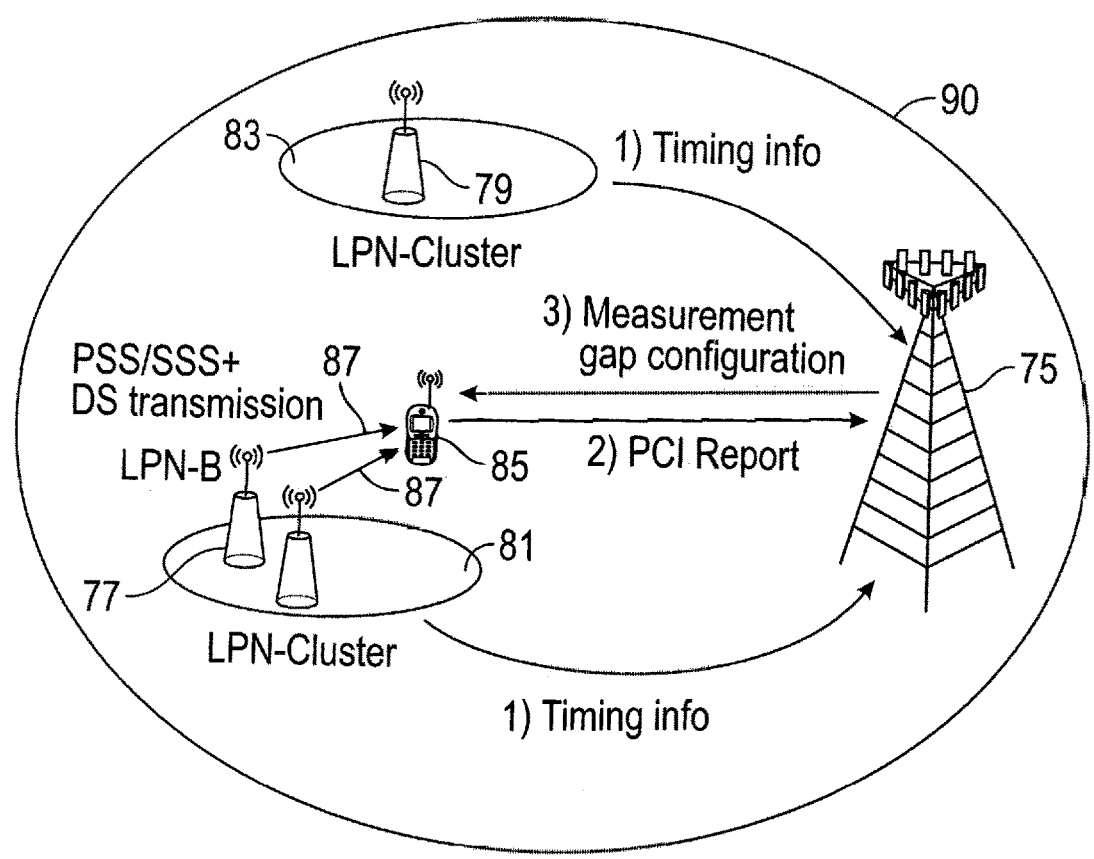
FIG. 17 is a schematic showing a network in which measurement gaps are based upon UE information and cell timing information.

In other embodiments such as shown in FIG. 17, there are multiple clusters that are not synchronized to each other. The serving cell sets up one measurement gap configuration at the UE. Thus, when there are several clusters within the coverage area of the serving cell, and these clusters are not synchronized to each other, an aspect of the disclosure provides that the serving cell may identify which cluster is most proximate to the UE. Then, the serving cell can configure the measurement gaps according to the timing and DS transmission scheme of the identified cluster more proximate to the UE. In one embodiment, the serving cell uses UE information to acquire a location estimate of UE and to configure the measurement gaps accordingly. In one embodiment, the UE information is a reported Physical Cell ID (PCI). This is illustrated in FIG. 17 which illustrates a serving configuring the measurement gaps based on UE info and timing information.

One procedure for the embodiment of FIG. 17 is as follows. UE 85 knows the PCIs of the nodes 77, 79 in the clusters 81, 83 of nodes within coverage area 90. UE 85 has all cluster timing available and provides the same to serving cell 75, at step "1) Timing info" in FIG. 17. UE 85 performs inter-frequency measurements with an initial measurement gap configuration that it has received from serving cell 75. UE 85 performs a legacy cell search and detects the PSS/SSS of one or multiple nodes 77, 79 sent along signal path 87 along with the discovery signal DS. Due to the transmission characteristics of the PSS/SSS, such a cell search is possible with any measurement gap configuration. UE 85 detects the PCI of one or several nodes. UE 85 reports signal strength and corresponding PCI to the serving cell 75 as indicated at step "2) PCI report" in FIG. 17. Serving cell 75 reconfigures the measurements gaps in such way that UE 85 can detect the DS transmitted of the low power nodes 77, 79 from the cluster of clusters 82, 83 that is proximate to UE 85 step "3) Measurement gap configuration" in FIG. 17.

Figure 18:
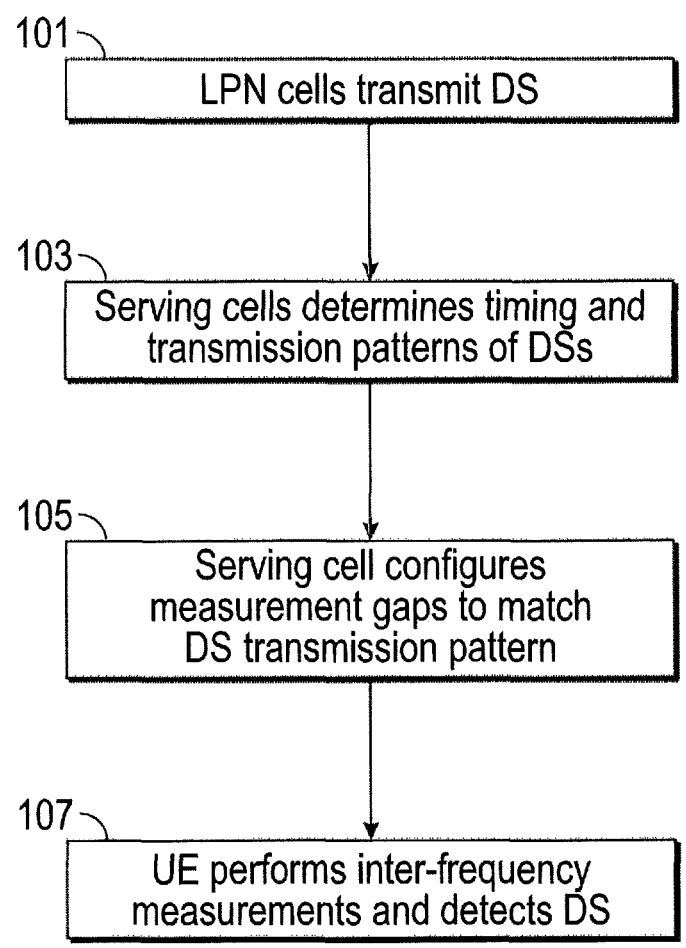
FIG. 18 is a flow chart illustrating a method according to various embodiments of the disclosure.

FIG. 18 is a flowchart showing a method according to the disclosure. At step 101, LPN cells transmit discovery signals, DSs. The LPN cells may be arranged in clusters within the coverage area of a macro cell in a HetNet communication system. At step 103, a serving cell determines the timing and transmission pattern of the DSs. In some embodiments, a UE performs a conventional cell search in an inter-frequency measurement gap, decodes an MIB and system frame numbers, SFNs, of a measured LPN cell and reports the same to the serving cell. In other embodiments, the UE provides other timing information to the serving cell. In still other embodiments, the serving cell determines timing and transmission pattern of the DSs associated with the LPN cells, in other manners. At step 105, the serving cell configures measurement gaps to match the DS transmission pattern. In some embodiments, the serving cell reconfigures an initial measurement gap configuration that the UE used to perform a legacy cell search and detect the PSS/SSS or other timing information. In some embodiments, the DS is situated directly in the center of the measurement gap and in other embodiments as described above, the measurement gap is configured to include at least part of a discovery signal. The measurement gap is configured by the serving cell taking into account granularity, timing inaccuracies and other aspects as discussed above in the various embodiments of this disclosure. At step 107, the UE performs inter-frequency measurements and detects the discovery signal to detect the presence of the low power node so that the UE can adjust its behavior accordingly and communicate with the appropriate cell/node in the network.

While one or more embodiments of the disclosure have been described above, it should be understood that they have been presented by way of example only, and not by way of limitation. Likewise, the various figures or diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations.

One or more of the functions described in this document may be performed by an appropriately configured module. The term "module" as used herein, can refer to hardware, firmware, software and any associated hardware that executes the software, and any combination of these elements for performing the associated functions described herein. Additionally, various modules can be discrete modules; however, as would be apparent to one of ordinary skill in the art, two or more modules may be combined to form a single module that performs the associated functions according various embodiments of the invention.

Additionally, one or more of the functions described in this document may be performed by means of computer program code that is stored in a "computer program product", "non-transitory computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

It will be appreciated that, for clarity purposes, the above description has described embodiments of the invention which can be implemented using different functional units and processors. However, it will be apparent that any suitable distribution of functionality between different functional units, processors or domains may be used without detracting from the invention. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization The preceding merely illustrates the principles of the disclosure. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the disclosure and the concepts contributed by the inventors to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the disclosure has been described in terms of embodiments, it is not limited thereto. Rather, the appended claims should be construed broadly, to include other variants and embodiments, which may be made by those skilled in the art without departing from the scope and range of equivalents.

What is claimed is:

1. A method for wireless communication, said method comprising:
   a cell transmitting discovery signals, said cell deployed in a cluster of cells deployed in a coverage area of a serving cell;
   said serving cell determining timing information of said cell and a discovery signal transmission pattern of said discovery signals of said cell;
   said serving cell configuring measurement gaps to match said discovery signal transmission pattern such that a user equipment (UE) can read said discovery signals in said measurement gaps; and
   said cell determining, based on granularity, timing information inaccuracy, lengths of measurement gaps, and durations of said discovery signals, that a certain discovery signal out of said discovery signals is not completely within a corresponding measurement gap out of said measurement gaps, and
   in response to the determining, said cell transmitting (2i+3) copies of said certain discovery signal, at least one copy being transmitted before said certain discovery signal, at least one copy being transmitted after said certain discovery signal when the timing information inaccuracy satisfies the condition $\Delta_2 \leq (T_{gap}/2) - \Delta_1 + (2i+1)T/2$, wherein $\Delta_1$ is granularity, $\Delta_2$ is timing information accuracy, T is duration of said certain discovery signal, $T_{gap}$ is duration of a corresponding measurement gap, and i is a non-negative integer.

2. The method as in claim 1, wherein said configuring said measurement gaps to match said discovery signal transmission pattern comprises configuring said measurement gaps such that said discovery signals are transmitted during said measurement gaps.

3. The method as in claim 1, further comprising said UE detecting said discovery signals during said measurement gaps, and after said configuring.

4. The method as is claim 1, wherein said UE is in communication with said serving cell and deployed within said coverage area.

5. The method as in claim 1, wherein said cells of said cluster of cells each comprise low power nodes (LPN's).

6. The method as in claim 5, wherein said serving cell determining timing information comprises said serving cell having some timing information of said cell and wherein said serving cell configuring measurement gaps includes said serving cell configuring said measurement gap taking into account timing information inaccuracies.

7. The method as in claim 1, further comprising said UE performing a conventional cell search in initial inter-frequency measurement gaps, providing said timing information of said cell to said serving cell and wherein said serving cell configuring measurement gaps comprises said serving cell repositioning said initial inter-frequency measurement gaps.

8. The method as in claim 1, wherein said cell transmitting discovery signals includes said cell transmitting different parts of at least one of said discovery signals at different times.

9. The method as in claim 8, wherein said parts of said at least one of said discovery signals are transmitted before and after transmission of a full copy of the at least one of the discovery signals.

10. A wireless communication system comprising:
a heterogeneous network (HetNet);
a serving cell with an associated coverage area;
cells in a cluster of cells deployed in said coverage area;
each cell of said cluster of cells configured to transmit discovery signals; said serving cell configured to determine timing information of said cells and a discovery signal transmission pattern of said corresponding discovery signals; and
said serving cell configured to configure measurement gaps such that said discovery signals are transmitted during said measurement gaps and such that a user equipment (UE) can read said discovery signals in said measurement gaps,
wherein, based on granularity, timing information inaccuracy, lengths of measurement gaps, and durations of said discovery signals, when a certain discovery signal out of said discovery signals is not completely within a corresponding measurement gap out of said measurement gaps, the cell transmits (2i+3) copies of said certain discovery signal, at least one copy being transmitted before said certain discovery signal, at least one copy being transmitted after said certain discovery signal when the timing information inaccuracy satisfies the condition $\Delta_2 \leq (T_{gap}/2) - \Delta_1 + (2i+1)T/2$, wherein $\Delta_1$ is granularity, $\Delta_2$ is timing information accuracy, T is duration of said certain discovery signal, $T_{gap}$ is duration of a corresponding measurement gap, and i is a non-negative integer.

11. The wireless communication system as in claim 10, wherein said serving cell is configured to configure said measurement gaps based on said timing information, duration of said discovery signals, and granularity of said wireless communication system.

12. The wireless communication system as in claim 10, wherein said cells comprise low power nodes (LPNs).

13. The wireless communication system as in claim 10, wherein said UE is adapted for communication with said serving cell and is deployed within said coverage area.

14. The wireless communication system as in claim 10, further comprising said UE further adapted to detect said discovery signals during said measurement gaps.

15. The wireless communication system as in claim 10, wherein each said cell configured to transmit discovery signals includes each said cell configured to transmit different parts of said discovery signal at different times.

16. The wireless communication system as in claim 15, wherein each said cell configured to transmit discovery signals includes each said cell adapted to transmit said different parts of said discovery signal before and after transmitting a full discovery signal of said discovery signals.

17. The wireless communication system as in claim 10, wherein each said cell configured to transmit discovery signals includes each said cell adapted to transmit two spaced-apart copies of said discovery signal and wherein said serving cell configured to configure measurement gaps includes said serving cell adapted to target a center of said measurement gap between said two spaced-apart copies of said discovery signal.

18. The wireless communication system as in claim 10, further comprising further cells in a further cluster of said further cells deployed in said coverage area and wherein said serving cell is further configured to determine which of said cluster and said further cluster is a more proximate cluster to said UE.

19. The wireless communication system as in claim 18, wherein said UE is further configured to perform a conventional cell search in initial inter frequency measurement gaps and provide said timing information to said serving cell and wherein said serving cell configured to configure measurement gaps includes said serving cell configured to configure first measurement gaps of one of said cells and said further cells of said more proximate cluster.

20. The wireless communication system as in claim 10, wherein each said cell configured to transmit discovery signals includes each said cell configured to transmit a plurality of successive copies of said discovery signals, and wherein said serving cell configured to configure measurement gaps includes said serving cell configured to configure at least one said measurement gap such that at least one said copy is received entirely with said measurement gap.

21. A wireless communication system, comprising:
a heterogeneous network (HetNet);
a serving cell with an associated coverage area;
cells in a cluster of cells deployed in said coverage area;
each cell of said cluster of cells configured to transmit discovery signals;
said serving cell configured to determine timing information of said cells and a discovery signal transmission pattern of said corresponding discovery signals; and
said serving cell configured to configure measurement gaps such that said discovery signals are transmitted during said measurement gaps and such that a user equipment (UE) can read said discovery signals in said measurement gaps,
wherein each cell of said cluster of cells is a low power node (LPN) configured to transmit a plurality of adjacent copies of a discovery signal of said discovery signals,
wherein, based on granularity, timing information inaccuracy, lengths of measurement gaps, and durations of said discovery signals, when a certain discovery signal out of said discovery signals is not completely within a corresponding measurement gap out of said measurement gaps, the cell transmits (2i+3) copies of said certain discovery signal, at least one copy being transmitted before said certain discovery signal, and at least one copy being transmitted after said certain discovery signal when the condition $\Delta_1 + \Delta_2 - (2i+1)T/2 \leq [T_{gap}/2]$ is satisfied, wherein $\Delta_1$ is granularity, $\Delta_2$ is timing information inaccuracy, T is duration of said discovery signal, $T_{gap}$ is duration of said measurement gap, and i is a non-negative integer.

22. The wireless communication system as in claim 21, further comprising said wireless communication system adapted to determine a number of said copies necessary to insure that one said copy is transmitted within said measurement gap, based on granularity and timing information inaccuracy.

\* \* \* \* \*